United States Patent [19]

Schaetzer et al.

[11] 4,445,905
[45] May 1, 1984

[54] PROCESS FOR TRICHROMATIC DYEING OR PRINTING OF POLYAMIDE

[76] Inventors: Harry Schaetzer, Wehr, Fed. Rep. of Germany; Helmut Raisin, Riehen; Dieter Mäusezahl, Biel-Benken, both of Switzerland; Ciba-Geigy AG, 03, Basel, Switzerland

[21] Appl. No.: 482,168

[22] Filed: Apr. 5, 1983

[30] Foreign Application Priority Data

Apr. 8, 1982 [CH] Switzerland .................. 2206/82

[51] Int. Cl.$^3$ .................. C09B 1/34; D06P 3/06
[52] U.S. Cl. .................. 8/641; 8/643; 8/680; 8/683; 8/692; 8/924; 8/929
[58] Field of Search .................. 8/641, 643, 683, 686, 8/680, 692

[56] References Cited

U.S. PATENT DOCUMENTS

| | | | |
|---|---|---|---|
| 1,927,125 | 9/1933 | Kalischer et al. | 260/372 |
| 3,713,768 | 1/1973 | Wegmuller | 8/586 |
| 3,778,453 | 12/1973 | Hindermann et al. | 260/374 |
| 3,932,378 | 1/1976 | Fasciati | 8/681 |
| 4,312,808 | 1/1982 | Lienhard et al. | 260/198 |
| 4,365,967 | 12/1982 | Guth et al. | 8/477 |
| 4,381,186 | 4/1983 | Magni et al. | 8/620 |
| 4,396,393 | 8/1983 | Schaetzer et al. | 8/643 |

FOREIGN PATENT DOCUMENTS 1315237  5/1973  United Kingdom .
1396126  6/1975  United Kingdom .

*Primary Examiner*—A. Lionel Clingman
*Attorney, Agent, or Firm*—Wenderoth, Lind & Ponack

[57] ABSTRACT

A process for the trichromatic dyeing and printing of natural and synthetic polyamide material with dyestuff mixtures. The process employs a red dye together with a blue mixture of dyes and a yellow or orange dye or mixtures thereof.

The process is suitable for dyeing natural or synthetic polyamide material from an aqueous liquid or for printing with printing pastes, especially for dyeing from short liquors.

15 Claims, No Drawings

PROCESS FOR TRICHROMATIC DYEING OR PRINTING OF POLYAMIDE

It is the object of the present invention to provide a process for dyeing or printing natural and synthetic polyamide material with dyes suitable for combination by the trichromatic technique. The dyes to be used in the process of this invention shall have a level colour build-up while at the same time ensuring a constant shade in different concentrations and they shall also have good compatibility. It has now been found that the process of this invention meets these requirements.

Accordingly, the present invention relates to a process for the trichromatic dyeing and printing of natural and synthetic polyamide material with dyestuff mixtures, which process comprises using a red dye of the formula

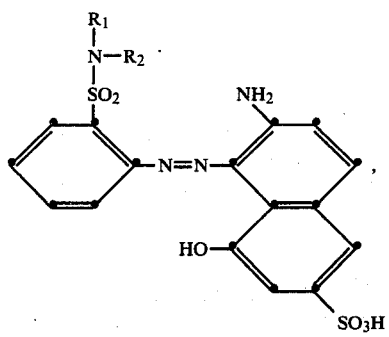

wherein $R_1$ is methyl or ethyl and $R_2$ is cyclohexyl or phenyl, together with a blue mixture of dyes of the formulae

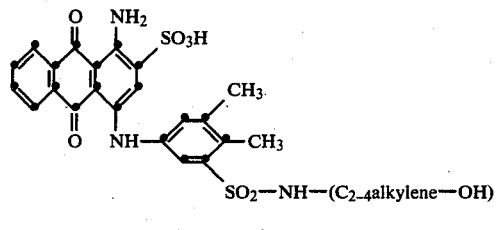

and

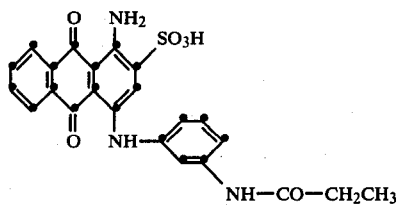

in the ratio of 90:10 to 10:90, and with a yellow or orange dye of the formula

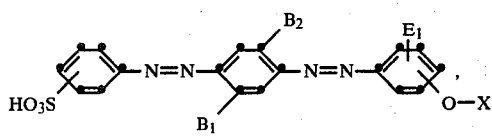

wherein $B_1$ is $C_1$–$C_4$ alkyl or $C_1$–$C_4$ alkoxy, each of $B_2$ and $E_1$ independently of the other is hydrogen, $C_1$–$C_4$ alkyl or $C_1$–$C_4$ alkoxy, and X is straight chain or branched $C_1$–$C_4$ alkyl or straight chain or branched $C_2$–$C_4$ hydroxyalkyl or a mixture of the dyes of the formulae (4) and

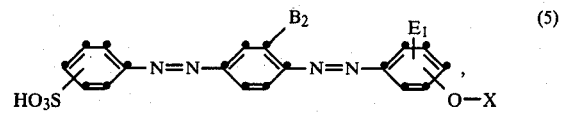

wherein $B_2$, $E_1$ and X independently of the other are as defined for formula (4), in the ratio of 80:20 to 20:80, or a mixture of the dyes of the formulae (4), (5) and

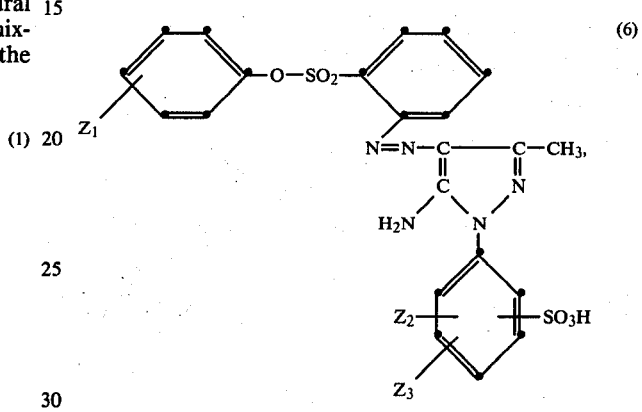

wherein each of $Z_1$, $Z_2$ and $Z_3$ independently of the other is hydrogen, halogen, $C_1$–$C_4$ alkyl or $C_1$–$C_4$ alkoxy, in the ratio of 8:10:10, 10:80:10 to 10:10:80.

The process of the invention is suitable for dying natural or synthetic polyamide material from an aqueous liquor or for printing with printing pastes, especially for dyeing from short liquors.

By the trichromatic technique is meant the additive blending of suitably chosen yellow or orange, red and blue dyes, with which each desired shade of the visible colour spectrum may be adjusted by appropriate choice of the quantity ratios.

Suitable alkyl radicals $B_1$, $B_2$, $E_1$, X, $Z_1$, $Z_2$ and $Z_3$ in formulae (4), (5) and (6) are, independently of one another, straight chain or branched alkyl radicals, e.g. methyl, ethyl, propyl, isopropyl, butyl, sec-butyl, isobutyl and tert-butyl.

Examples of suitable alkoxy radicals $B_1$, $B_2$, $E_1$, $Z_1$, $Z_2$ and $Z_3$ in formulae (4), (5) and (6) are methoxy, ethoxy, propoxy, isopropoxy, butoxy, isobutoxy or tert-butoxy.

A suitable hydroxyalkyl radical X in formulae (4) and (5) is a straight chain or branched hydroxyalkyl radical, e.g. β-hydroxyethyl, β-hydroxypropyl, β-hydroxybutyl or α-ethyl-β-hydroxyethyl.

The $SO_2$—NH— ($C_2$–$C_4$alkylene-OH) radical in formula (2) may be the β-hydroxyethylsulfamoyl, β-hydroxypropylsulfamoyl, γ-hydroxypropylsulfamoyl or β-hydroxybutylsulfamoyl radical.

$Z_1$, $Z_2$ and $Z_3$ as halogen in formula (6) are, independently of each other, fluorine or bromine and preferably chlorine.

As red dye of the formula (1) it is preferred to use the dyes of the formulae

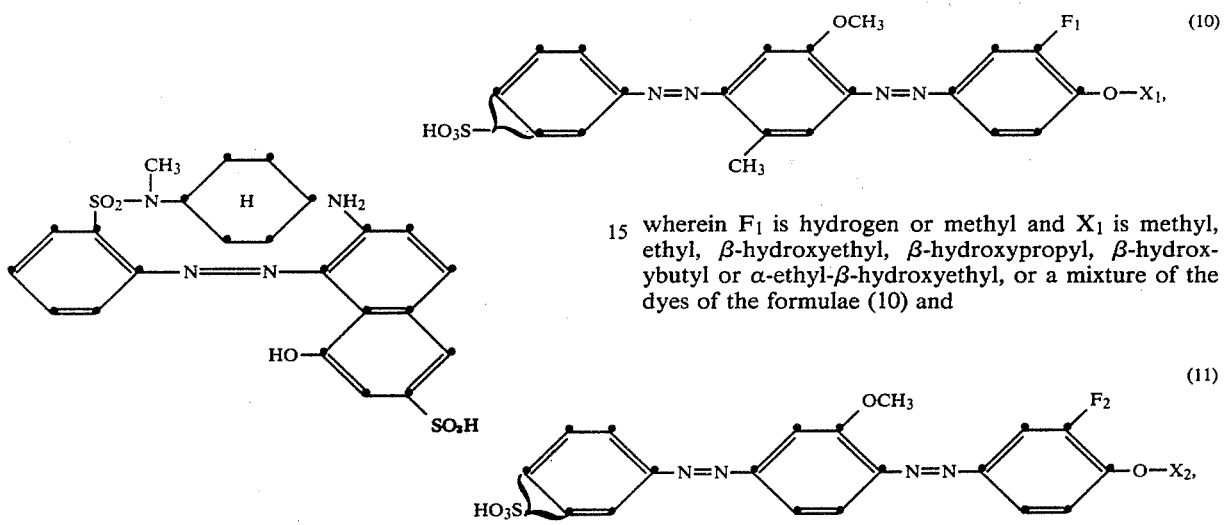

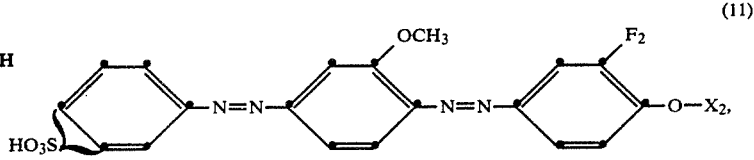

wherein $F_1$ is hydrogen or methyl and $X_1$ is methyl, ethyl, β-hydroxyethyl, β-hydroxypropyl, β-hydroxybutyl or α-ethyl-β-hydroxyethyl, or a mixture of the dyes of the formulae (10) and

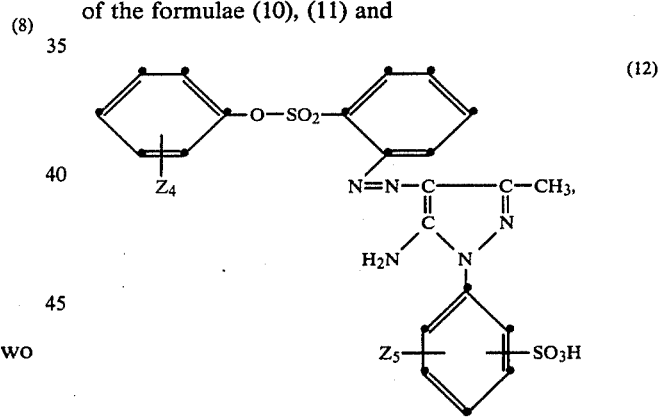

wherein $F_2$ is hydrogen or methyl and $X_2$ is methyl, ethyl, β-hydroxyethyl, β-hydroxypropyl, β-hydroxybutyl or α-ethyl-β-hydroxyethyl, in the ratio of 60:40 to 40:60, in particular of 50:50, or a mixture of the dyes of the formulae (10), (11) and As blue dye it is preferred to use a mixture of the two dyes of the formulae

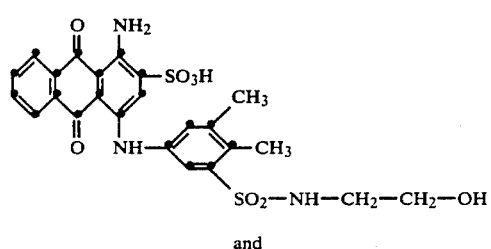

and

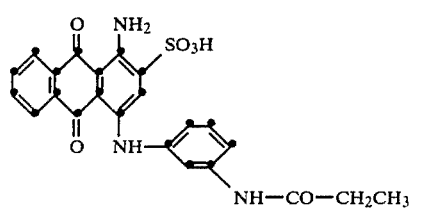

wherein each of $Z_4$ and $Z_5$ independently of the other is hydrogen, methyl or chlorine, in the ratio of 60:20:20, 20:60:20 to 20:20:60 and, in particular, in the ratio of 1:1:1.

The particularly preferred process variants comprise using the red dye of the formula (7) or that of the formula (8) together with the blue mixture of the dyes of the formulae (9) and (3) in the ratio of 80:20 to 20:80, advantageously of 60:40 to 40:60 and especially of 52:48, (a) with the orange dye of the formula

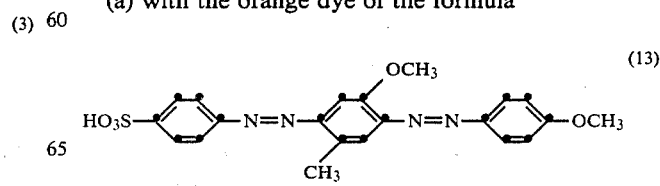

(b) with the yellow mixture of dyes of the formulae

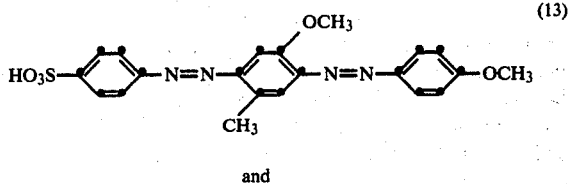

and

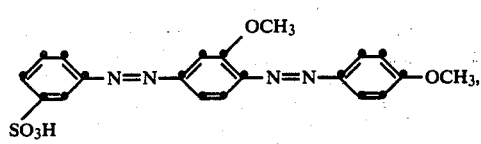

in the ratio of 60:40 to 40:60 and in particular of 50:50, or (c) with the yellow mixture of dyes of the formulae (13), (14) and

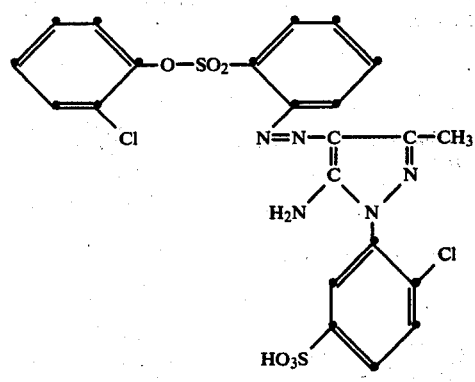

in the ratio of 1:1:1.

The dyes employed in the process for trichromatic dyeing or printing are known or they may be prepared by methods similar to known ones. For example, the dyes of formula (1) may be obtained in accordance with the particulars of German patent specification Nos. 702 932 and 2 063 907, those of the formulae (9) and (3) in accordance with the particulars of U.S. Pat. Nos. 3,778,453 and 1,927,125, and those of the formulae (13), (14) and (15) in accordance with the particulars of German Offenlegungsschrift No. 21 42 412 and German Auslegeschrift No. 11 00 846.

If mixtures of dyes of the formulae (2) and (3), or of the formulae (4), (5) and (6), are used in the process of this invention, these mixtures may be prepared by mixing the individual dyes. Mixing is effected e.g. in suitable mills, e.g ball mills and disc attrition mills, as well as in kneaders or mixers. Further, the mixtures of dyes of the formulae (2) and (3), or of the formulae (4) and (5) or (4), (5) and (6), may be obtained by spray drying the aqueous dyestuff mixtures.

The dyes employed in the process of the invention are either in the form of their free sulfonic acids or, preferably, of their salts.

Examples of suitable salts are the alkali metal salts, alkaline earth metal salts or ammonium salts, or the salts of an organic amine. Typical examples are the sodium, lithium, potassium or ammonium salts or the salt of triethanolamine.

The dyes employed in the process of the invention usually contain further ingredients, e.g. sodium chloride or dextrin.

The trichromatic dyeing or printing process of this invention is susceptible of application to conventional dyeing or printing methods. In addition to containing water and the dyes, the dye liquors or printing pastes may contain further ingredients, e.g. wetting agents, antifoams, levelling agents or agents which influence the characteristics of the textile material, e.g. softeners, flameproofing additives, or dirt, water and oil repellents, as well as water softeners and natural or synthetic thickeners, e.g. alginates and cellulose ethers.

The process of this invention is especially suitable for dyeing from short liquors, e.g. in continuous dyeing or discontinuous and continuous foam dying processes.

In trichromatic dyeing or printing, the dyes employed in the process of this invention are distinguished by level colour build-up, good exhaustion properties, good constancy of shade even in different concentrations, good fastness properties, as well as in particular by very good compatibility.

The process of this invention is suitable for dyeing or printing both natural polyamide material, e.g. wool, and, in particular, synthetic polyamide material, e.g. perlon or nylon, and is suitable for dyeing or printing blends or yarns of wool and synthetic polyamide. The textile material may be in the most widely different forms of processing, e.g. in the form of fibre, yarn, wovens or knits and, in particular, of carpets.

In the following Examples, parts are by weight. The relationship between parts by weight and parts by volume is the same as that between the gram and the cubic centimeter.

Example 1

The dyestuff mixture comprising a dye of the formula

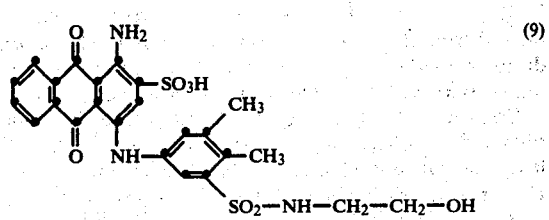

and a dye of the formula

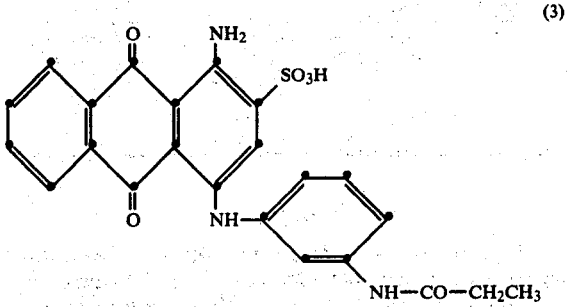

is prepared by homogeneously mixing, in a mixer, (a) 26.6 parts of the dye of the formula (9) and 73.4 parts of the dye of the formula (3) to give 100 parts of the mixture referred to below as dyestuff mixture A;

(b) 52 parts of the dye of the formula (9) and 48 parts of the dye of the formula (3) to give 100 parts of the mixture referred to below as dyestuff mixture B;

(c) 76.5 parts of the dye of the formula (9) and 23.5 parts of the dye of the formula (3) to give 100 parts of the mixture referred to below as dyestuff mixture C.

Example 2

10 parts of Helanca knitted fabric are dyed in 500 parts of an aqueous liquor which contains 2 g/l of ammonium acetate and has been adjusted to pH 5 with acetic acid. The dyes used are 0.12% of the red dye of the formula

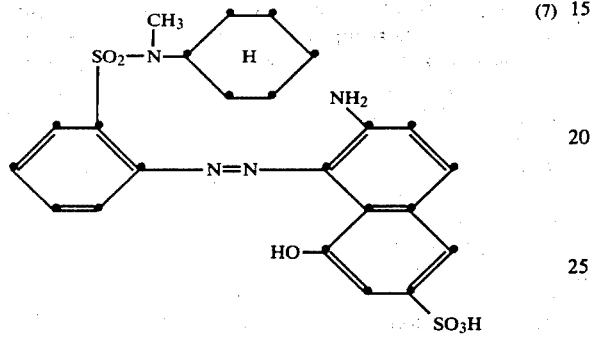

and 0.27% of the orange dye of the formula

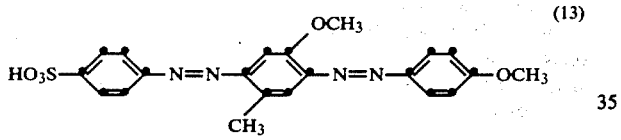

and 0.13% of the blue dyestuff mixture B obtained in Example 1b, the amounts being based on the weight of the fabric. The dyeing time at a temperature of 98° C. is 30 to 90 minutes. The dyed Helanca fabric is then removed from the liquor, rinsed in customary manner and dried. A completely level, neutral boron shade is obtained with no trace of material-induced barriness.

Completely level dyeings in the indicated shade aare obtained by using the dyes of formulae (13) and (7) listed in Table 1 as well as the dyestuff mixtures of Example 1, instead of 0.27% of the orange dye of the formula (13), 0.12% of the red dye of the formula (7) and 0.13% of the blue dyestuff mixture B.

TABLE 1

| Example | Dyes | Shade |
| --- | --- | --- |
| 3 | 0.18% of the dye of formula (13) 0.18% of the dye of formula (7) 0.077% of dyestuff mixture C. | reddish brown |
| 4 | 0.25% of the dye of formula (13) 0.04% of the dye of formula (7) 0.14% of dyestuff mixture A | olive |

Example 5

10 parts of polyamide 66 yarn are dyed in 400 parts of an aqueous liquor which contains 1.5 g/l of ammonium acetate and has been adjusted to pH 5.5 with acetic acid. The dyes used are 0.27% of the dye of formula (13), 0.12% of the dye of formula (7) and 0.13% of the dyestuff mixture B obtained in Example 1b, the amounts being based on the weight of the fabric. The dyebath is heated to 98° C. over 30 minutes and kept for 60 minutes at 96° C. to 98° C. The dyed yarn is then taken out and rinsed in the customary manner and dried. A neutral brown shade is obtained on the yarn. Yarn dyed in the indicated shade is obtained by using the dyes of formulae (13) and (7) indicated in Table 2 as well as the dyestuff mixtures of Example 1, instead of 0.27% of the dye of formula (13), 0.12% of the red dye of formula (7) and 0.13% of the blue dyestuff mixture B.

TABLE 2

| Example | Dyes | Shade |
| --- | --- | --- |
| 6 | 0.18% of the dye of formula (13) 0.18% of the dye of formula (7) 0.077% of dyestuff mixture C | reddish brown |
| 7 | 0.25% of the dye of formula (13) 0.05% of the dye of formula (7) 0.14% of dyestuff mixture A | olive |

Yarn dyed in the indicated shade with the dyes listed in Table 3 is obtained by further using, instead of the orange dye of formula (13), a 1:1 mixture of the orange dye of the formula

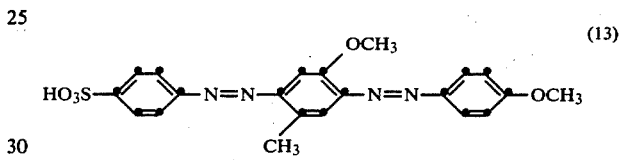

and of the yellow dye of the formula

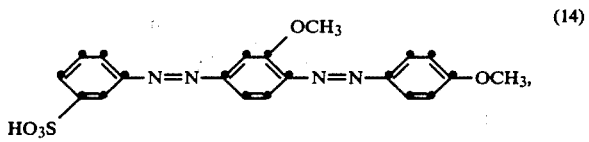

which mixture is referred to in the subsequent Examples as dyestuff mixture X, together with the red dye of the formula (7) and the dyestuff mixtures of Example 1.

TABLE 3

| Example | Dyes | Shade |
| --- | --- | --- |
| 8 | 0.27% of dyestuff mixture X 0.1% of the dye of formula (7) 0.14% of dyestuff mixture B | neutral brown |
| 9 | 0.18% of dyestuff mixture X 0.12% of the dye of formula (7) 0.09% of dyestuff mixture C | reddish brown |
| 10 | 0.25% of dyestuff mixture X 0.03% of the dye of formula (7) 0.16% of dyestuff mixture A | olive |

Example 11

The procedure of Example 5 is repeated, using 0.27% of the yellow dyestuff mixture consisting of the dyes of the formulae

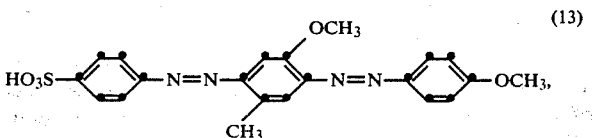

-continued

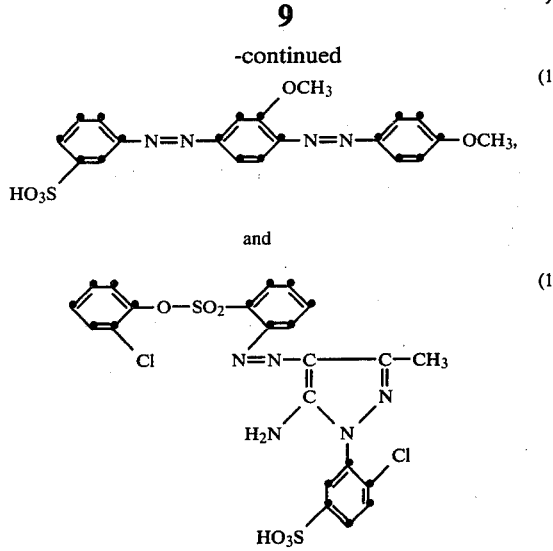

in the ratio 1:1:1, instead of 0.27% of the dye of formula (13). A yarn dyed in a neutral brown shade is obtained.

Yarn dyed in the indicated shade is obtained by using, instead of 0.13% of dyestuff mixture B, the dyestuff mixtures A and C listed in Table 4 and, as dyestuff mixture Y, the above 1:1:1 mixture of dyes of the formula (13), (14) and (15).

TABLE 4

| Example | Dyes | Shade |
| --- | --- | --- |
| 12 | 0.18% of dyestuff mixture Y<br>0.12% of the dye of formula (7)<br>0.09% of dyestuff mixture C | reddish<br>brown |
| 13 | 0.25% of dyestuff mixture Y<br>0.03% of the dye of formula (7)<br>0.16% of dyestuff mixture A | olive |

EXAMPLE 14

500 m$^2$ of a polyamide 66 cut-pile carpet (brushed goods backed with polypropylene tape fabric) having a weight of 535 g/m$^2$ are continuously prewetted in a liquor which contains 1 g/liter of the polyadduct of 1 mole of nonylphenol and 9 moles of ethylene oxide, and then expressed to a pick-up of 40% by weight.

A dye foam having a blow ratio of 1:10 is prepared in a mixer from an aqueous liquor of the following composition:

0.6 g/l of the orange dye of the formula (13),
0.4 g/l of the red dye of the formula (7),
0.35 g/l of the blue dyestuff mixture B,
2.5 g/l of a foam stabiliser mixture consisting of coconut fatty acid diethanolamide/nonylphenol polyglycol(11) ether and sodium lauryl triglycol ether sulfate,
0.6 g/l of the oxyalkylene-siloxane copolymer of the formula

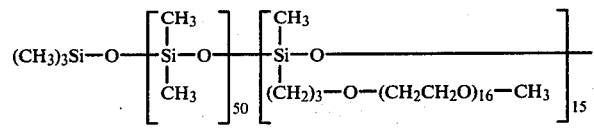

1 g/l of sodium acetate, and acetic acid for adjusting the pH value of the liquor to 6.

This foam is then applied from a container, equipped with a knife for adjusting the desired thickness of the foam, via an applicator roll using a carriage to the pile side of the carpet which passes through the dyeing unit at a rate of 9 m/minute. The height of the foam is 8 mm. The foam add-on is 135%.

A vacuum (~0.1 bar) is then applied to the back of the carpet in order to effect partial penetration of the layer of foam into the carpet, whereby the height of the foam is somewhat reduced. The carpet then passes over a conveyor roll into a steamer (102° C., saturated steam), where the foam rises slightly and is then collapsed. The carpet is subsequently sprayed with water of 80° C., then centrifuged, and dried at 100°–130° C. in a cylindrical sieve drier.

The carpet fabric is dyed in a level beige shade with excellent penetration of the dye. The foam dyeing has a positive influence on the softness and bulk of the fabric.

Example 15: (Carpet printing)

A polyamide 6 cut-pile fitted carpet having a weight of 350 to 400 g/m$^2$ is impregnated on a padder with a padding liquor consisting of 988 parts of water, 10 parts of 36° Bé sodium hydroxide solution and 2 parts of wetting agent, and squeezed out to a pick-up of 80%.

A dye paste of the following composition is sprayed in the form of a pattern, by means of a nozzle, onto the pretreated carpet: 942 parts of water, 50 parts of thickener, 3 parts of an antifoam, 3 parts of the dyestuff mixture X of Example 8, 9 or 10, 1 part of the red dye of the formula (7) of Example 2 and 1 part of the blue dyestuff mixture A of Example 1.

The thickener used has the following composition: 240 parts of white spirit, 50 parts of a water-in-oil emulsifier, 20 parts of an oil-in-water emulsifier, 20 parts of an antifoam, 50 parts of a crosslinked carboxyvinyl polymer having a molecular weight of approx. 4.000.000, 70 parts of a linear carboxyvinyl polymer having a molecular weight of approx. 1.000.000 and 550 parts of water, the pH having been adjusted to a value of 4.5 with acetic acid.

The material which has been sprayed with the dye paste is then treated with saturated steam at 101° C. for 5 minutes in order to fix the dyes, then rinsed, neutralised, rinsed again and dried. A brown pattern with very sharp contours is obtained on the cut-pile fitted carpet. Dye penetration is very good and there is absolutely no frosting.

Example 16: (Continuous carpet dyeing)

2.7 parts of the dyestuff mixture Y of Example 11, 1.2 parts of the red dye of the formula (7) of Example 1 and 1.3 parts of the blue dyestuff mixture B of Example 1 are dissolved in 100 parts of water by brief boiling. This solution is then added to a solution containing 3 parts of a thickener based on locust bean gum, 5.0 parts of a coacervate-forming padding assistant based on a condensation product of a higher-molecular fatty acid with an oxaalkylamine, 2.0 parts of crystalline monosodium phosphate and 1.0 part of crystalline disodium phosphate in 500 parts of cold water. The mixture is then bulked to 1000 parts with cold water. 300% (based on the weight of carpet) of this liquor, which has a pH value of 5.5 to 6.5, are then applied to a polyamide tufted undyed carpet, at a carpet speed of 8 meters per minute. The impregnated carpet is passed into a festoon steamer, where it is treated for 10 minutes with saturated steam at 98° to 100° C. The carpet is then washed in an open width washing machine. It is dyed in a neutral brown shade.

Carpets which are levelly dyed in the indicated shade are obtained by using the dyes and dyestuff mixtures in Table 5 instead of 2.7 parts of dyestuff mixture Y, 1.2 parts of the red dye of formula (7) and 1.3 parts of the blue dyestuff mixture B.

TABLE 5

| Example | Dyes | Shade |
|---|---|---|
| 17 | 2.4 parts of dyestuff mixture Y<br>2.3 parts of the dye of formula (7)<br>1.0 parts of dyestuff mixture B | reddish brown |
| 18 | 3.0 parts of dyestuff mixture Y<br>0.4 parts of the dye of formula (7)<br>1.2 parts of dyestuff mixture B | olive |

Example 19

10 parts of polyamide 66 yarn are dyed in 400 parts of an aqueous liquor which contains 1.5 g/l of ammonium acetate and is adjusted to pH 5.5 with acetate acid. The dyes used are 0.27% of the dye of formula (13), 0.12% of the dye of formula

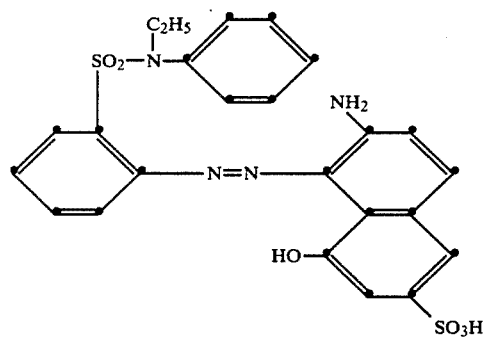

(8)

and 0.13% of the dyestuff mixture B obtained in Example 1b, the amounts relating to the weight of the fibre. The dyebath is heated to 98° C. over 30 minutes and is kept at 96° to 98° C. for 60 minutes. The dyed yarn is then taken out and rinsed and dried in customary manner. Yarn which has been dyed in a neutral brown shade is obtained.

Example 20: (Continuous wool dyeing)

A woollen material is padded with a liquor containing 2.6 parts of the dyestuff mixture X of Example 15, 5.2 parts of the red dye of formula (7), 15.7 parts of the blue dyestuff mixture B, 2.0 parts of an alginate thickener, 22.0 parts of a coacervate-forming padding agent based on a condensation product of a higher-molecular fatty acid with a hydroxyalkylamine, and 8.0 parts of 80% formic acid in 1.000 parts of water. The pick-up is 85%, based on the weight of the wool. The material is then steamed for 15 minutes in saturated steam at 98° to 100° C. then washed.

A level olive dyeing is obtained.

Example 21

The procedure of Example 5 is repeated, using 0.12% of the dye of formula (8) instead of 0.12% of the dye of formula (7), to give yarn which is dyed in a neutral brown shade.

What is claimed is:

1. In a process for the trichromatic dyeing and printing of natural and synthetic polyamide material with dyestuff mixtures, the improvement which comprises using a red dye of the formula

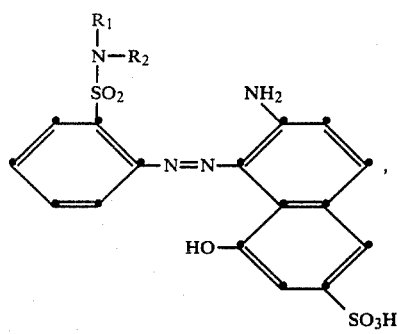

(1)

wherein $R_1$ is methyl or ethyl and $R_2$ is cyclohexyl or phenyl, together with a blue mixture of dyes of the formulae

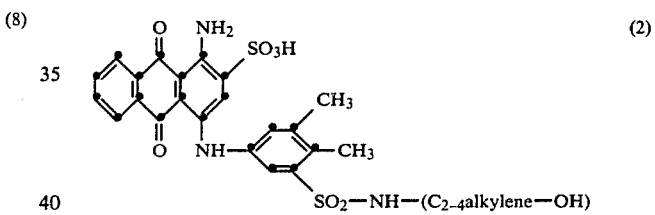

(2)

and

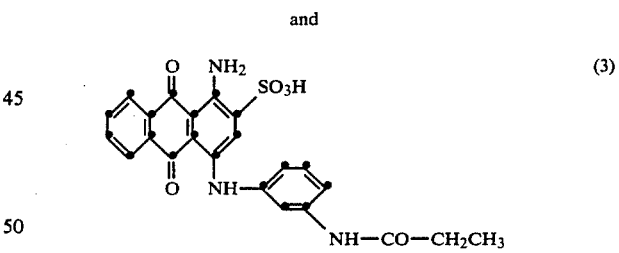

(3)

in the ratio of 90:10 to 10:90, and with a yellow or orange dye of the formula

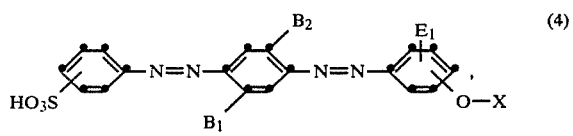

(4)

wherein $B_1$ is $C_1$-$C_4$alkyl or $C_1$-$C_4$alkoxy, each of $B_2$ and $E_1$ independently of the other is hydrogen, $C_1$-$C_4$alkyl or $C_1$-$C_4$alkoxy, and X is straight chain or branched $C_1$-$C_4$alkyl or straight chain or branched $C_2$-$C_4$hydroxyalkyl or a mixture of the yellow and orange dyes of the formulae (4) and

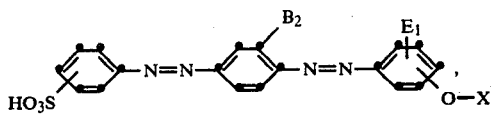

(5)

wherein $B_2$, $E_1$ and X independently of the other are as defined for formula (4), in the ratio of 80:20 to 20:80, or a mixture of the yellow and orange dyes of the formulae (4), (5) and

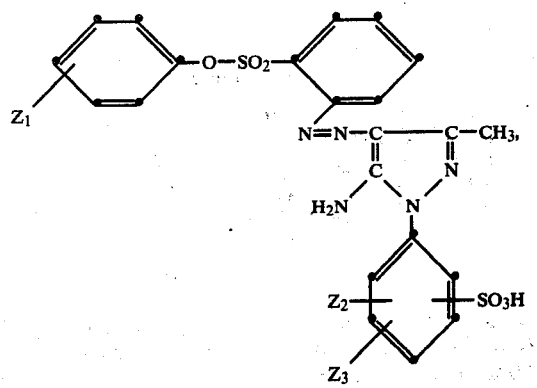

(6)

wherein each of $Z_1$, $Z_2$ and $Z_3$ independently of the other is hydrogen, halogen, $C_1$-$C_4$alkyl or $C_1$-$C_4$alkoxy, in the ratio of 8:10:10, 10:80:10 to 10:10:80.

2. A process according to claim 1, which comprises using a dye of the formula (1) together with a mixture of the dyes of the formulae (2) and (3) and a dye of the formula (4).

3. A process according to claim 1, which comprises using a dye of the formula (1) together with a mixture of dyes of the formulae (2) and (3) and a mixture of dyes of the formulae (4) and (5).

4. A process according to claim 1, which comprises using a dye of the formula (1) together with a mixture of dyes of the formulae (2) and (3) and a mixture of dyes of the formulae (4), (5) and (6).

5. A process according to claim 1, which comprises using as dye of the formula (1) the red dye of the formula

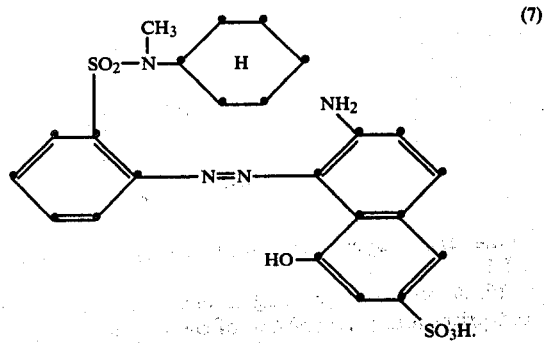

6. A process according to claim 1, which comprises using as dye of the formula (1) the red dye of the formula

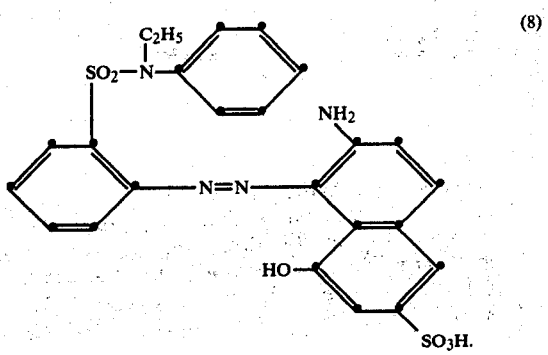

(8)

7. A process according to claim 1, which comprises using as blue dyes of the formulae (2) and (3) the two dyes of the formulae

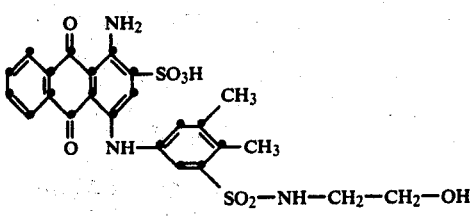

(9)

and

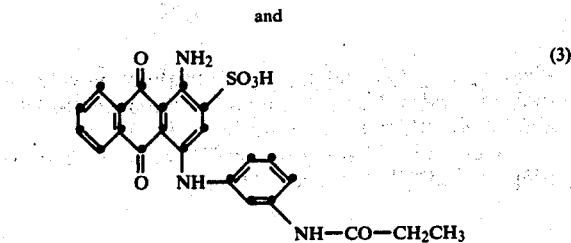

(3)

in the ratio of 80:20 to 20:80 and, in particular, of 60:40 to 40:60.

8. A process according to claim 1, which comprises using as yellow or orange dye of the formula (4) a dye of the formula

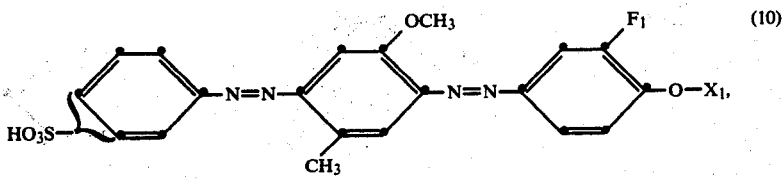

(10)

wherein $F_1$ is hydrogen or methyl and $X_1$ is methyl, ethyl, β-hydroxyethyl, β-hydroxypropyl, β-hydroxybutyl or α-ethyl-β-hydroxyethyl, or as mixture of the yellow or orange dyes of the formulae (4) and (5) a mixture of the dyes of the formulae (10) and

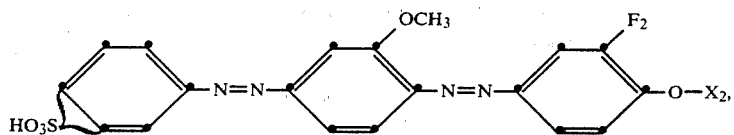

wherein $F_2$ is hydrogen or methyl and $X_2$ is methyl, ethyl, β-hydroxyethyl, β-hydroxypropyl, β-hydroxybutyl or α-ethyl-β-hydroxyethyl, in the ratio of 60:40 to 40:60 and, in particular, of 50:50, or as mixture of the yellow or orange dyes of the formulae (4), (5) and (6) a mixture of the dyes of the formulae (10), (11) and

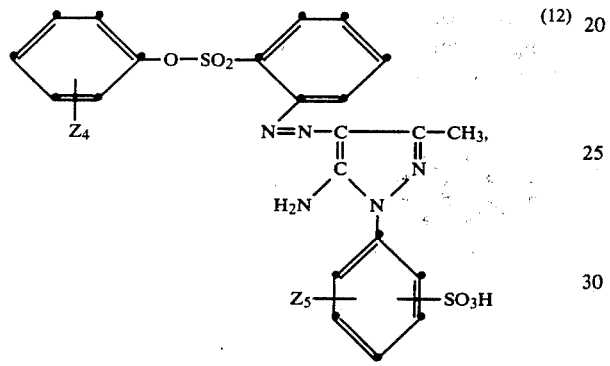

wherein each of $Z_4$ and $Z_5$ independently of the other is hydrogen, methyl or chlorine, in the ratio of 60:20:20, 20:60:20 to 20:20:60 and, in particular, of 1:1:1.

9. A process according to claim 1, which comprises using the red dye of the formula

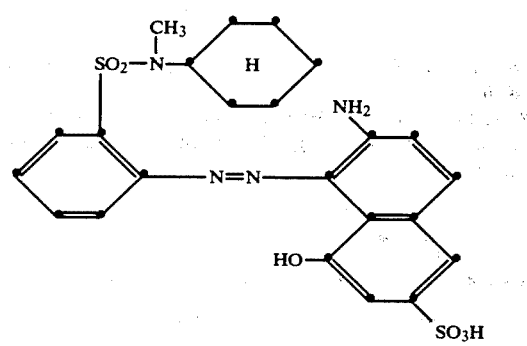

together with the blue mixture of dyes of the formulae

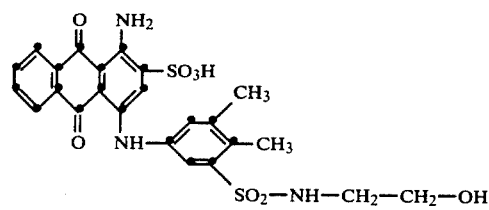

and

-continued

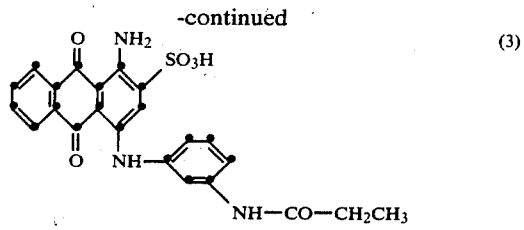

in the ratio of dyes of the formulae (9) and (3) of 80:20 to 20:80 and, in particular, of 60:40 to 40:60, and with the orange dye of the formula

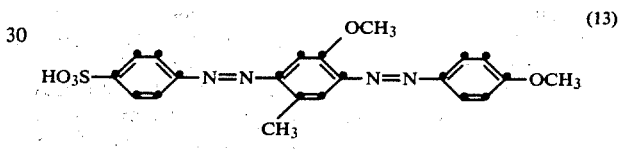

or with the yellow mixture of dyes of the formulae (13) and

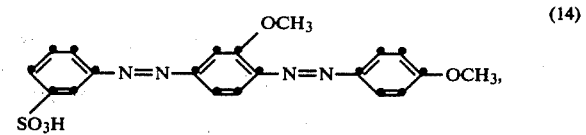

in the ratio of dyes of the formulae (13) and (14) of 60:40 to 40:60, in particular of 50:50, or with the yellow mixture of dyes of the formulae (13), (14) and

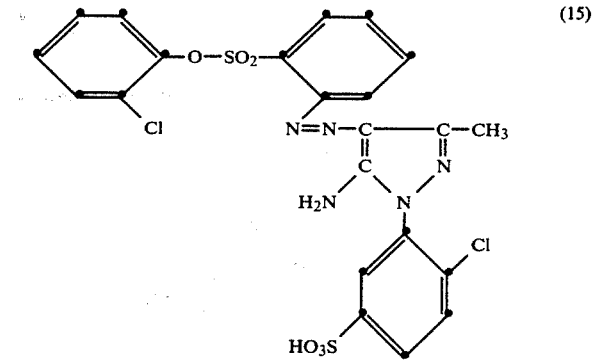

in the ratio of dyes of the formulae (13), (14) and (15) of 1:1:1.

10. A process according to claim 1, which process comprises using the red dye of the formula

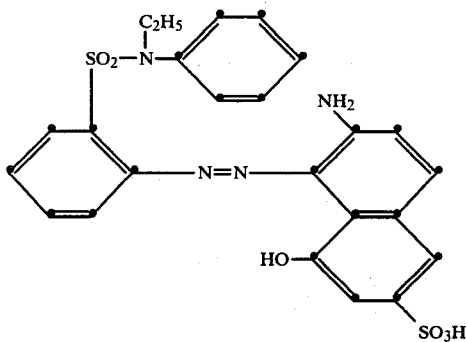 (8)

together with the blue mixture of dyes of the formulae

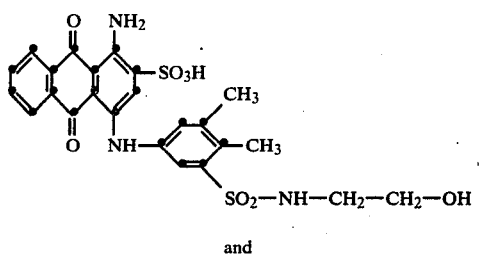 (9)

and

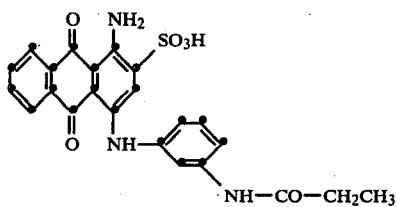 (3)

in the ratio of dyes of the formulae (9) and (3) of 80:20 to 20:80, and, in particular, of 60:40 to 40:60, and with the orange dye of the formula

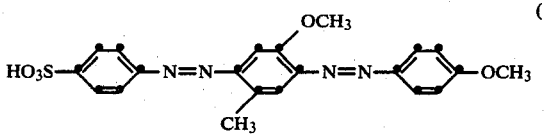 (13)

or with the yellow mixture of dyes of the formulae (13) and

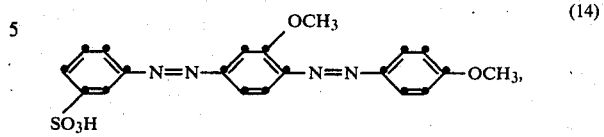 (14)

in the ratio of dyes of the formulae (13) and (14) of 60:40 to 40:60, in particular of 50:50, or with the yellow mixture of dyes of the formulae (13), (14) and

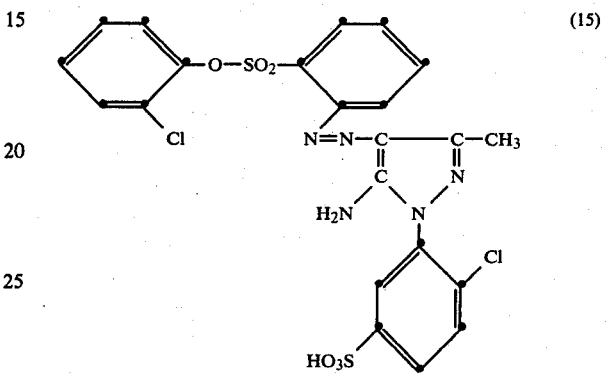 (15)

in the ratio of dyes of the formulae (13), (14) and (15) of 1:1:1.

11. A process according to claim 1 for the trichromatic dyeing or printing of material made from natural and synthetic polyamide, which process comprises treating said material with a dye liquor or printing paste which contains the dyestuff mixture according to claim 1, together with water and optionally further ingredients.

12. An aqueous dye liquor or printing paste which contains the dyestuff mixture according to claim 1 and optionally further ingredients.

13. A polyamide material dyed or printed by the process according to claim 11.

14. A polyamide material dyed or printed by a trichromatic dyeing or printing process using the dye liquor or printing paste according to claim 12.

15. A polyamide carpet material according to claim 13.

* * * * *

UNITED STATES PATENT AND TRADEMARK OFFICE
CERTIFICATE OF CORRECTION

PATENT NO. : 4,445,905
DATED : May 1, 1984
INVENTOR(S) : HARRY SCHAETZER; HELMUT RAISIN; DIETER MAUSEZAHL

It is certified that error appears in the above-identified patent and that said Letters Patent is hereby corrected as shown below:

On the title page of the patent, under the section entitled
"[76] Inventors:", lines 4 and 5, after "Switzerland" delete
"; Ciba-Geigy AG, ?3, Basel, Switzerland";

before section "[21]", insert
--[73] Assignee: Ciba-Geigy AG, Basel, Switzerland--.

Column 2, line 34, change "8:10:10" to read --80:10:10--.

Column 13, line 30, change "8:10:10" to read --80:10:10--.

Signed and Sealed this

Fourth Day of December 1984

[SEAL]

Attest:

GERALD J. MOSSINGHOFF

Attesting Officer

Commissioner of Patents and Trademarks